US011100397B2

(12) United States Patent
Merkel et al.

(10) Patent No.: US 11,100,397 B2
(45) Date of Patent: Aug. 24, 2021

(54) METHOD AND APPARATUS FOR TRAINING MEMRISTIVE LEARNING SYSTEMS

(71) Applicants: Cory Merkel, Rochester, NY (US); Dhireesha Kudithipudi, Pittsford, NY (US)

(72) Inventors: Cory Merkel, Rochester, NY (US); Dhireesha Kudithipudi, Pittsford, NY (US)

(73) Assignee: Rochester Institute of Technology, Rochester, NY (US)

( * ) Notice: Subject to any disclaimer, the term of this patent is extended or adjusted under 35 U.S.C. 154(b) by 567 days.

(21) Appl. No.: 15/159,949

(22) Filed: May 20, 2016

(65) Prior Publication Data

US 2016/0342904 A1 Nov. 24, 2016

Related U.S. Application Data

(60) Provisional application No. 62/164,776, filed on May 21, 2015.

(51) Int. Cl.
*G06N 3/08* (2006.01)
*G06N 99/00* (2019.01)
*G06N 3/063* (2006.01)

(52) U.S. Cl.
CPC ........... *G06N 3/084* (2013.01); *G06N 3/0635* (2013.01)

(58) Field of Classification Search
CPC ........ G06N 3/084; G06N 3/0635; G06N 3/08; G06N 3/063; G06N 3/04; G06N 99/00
USPC ...................................................... 706/1–62
See application file for complete search history.

(56) References Cited

U.S. PATENT DOCUMENTS

| 7,287,014 B2 | 10/2007 | Chen et al. |
| 8,433,665 B2 | 4/2013 | Tang et al. |
| 8,676,734 B2 | 3/2014 | Aparin |
| 8,725,658 B2 | 5/2014 | Izhikevich et al. |
| 8,750,065 B2 | 6/2014 | Merkel et al. |
| 9,015,093 B1* | 4/2015 | Commons .......... G01C 21/3602 706/26 |
| 2013/0311413 A1 | 11/2013 | Rose et al. |
| 2013/0325774 A1 | 12/2013 | Sinyayskiy et al. |
| 2013/0325775 A1 | 12/2013 | Sinyavskiy et al. |
| 2014/0156576 A1* | 6/2014 | Nugent .................. G06N 3/049 706/25 |
| 2015/0019468 A1* | 1/2015 | Nugent ................ G06N 3/0418 706/25 |
| 2015/0170025 A1 | 6/2015 | Wu et al. |
| 2015/0206050 A1* | 7/2015 | Talathi ..................... G06N 3/08 706/25 |

(Continued)

FOREIGN PATENT DOCUMENTS

WO  WO2014151926 A2  9/2014

OTHER PUBLICATIONS

International Search Report and Written Opinion in correspondence application (PCT/US2016/033428) dated Aug. 25, 2016.

*Primary Examiner* — Brandon S Cole (74) *Attorney, Agent, or Firm* — Bond, Schoeneck & King, PLLC; Joseph Noto (57) ABSTRACT

Disclosed is a method for training memristive learning systems (MLSs) using stochastic learning algorithms and the training system apparatus designed to implement the stochastic learning algorithms.

6 Claims, 7 Drawing Sheets

(56) References Cited

U.S. PATENT DOCUMENTS

| | | | | |
|---|---|---|---|---|
| 2015/0347899 A1* | 12/2015 | Nugent | ............... | G06N 3/063 |
| | | | | 706/25 |
| 2015/0358151 A1* | 12/2015 | You | ....................... | G09C 1/00 |
| | | | | 380/287 |
| 2016/0004959 A1* | 1/2016 | Nugent | ............... | G06N 3/063 |
| | | | | 706/26 |
| 2017/0109628 A1* | 4/2017 | Gokmen | ........... | G06N 3/0472 |
| 2018/0174035 A1* | 6/2018 | Nugent | ............... | G06N 3/063 |

\* cited by examiner

METHOD AND APPARATUS FOR TRAINING MEMRISTIVE LEARNING SYSTEMS

CROSS REFERENCE

This application claims the benefit of the filing date of U.S. Provisional Patent Application Ser. No. 62/164,776, filed May 21, 2015, which is hereby incorporated by reference in its entirety.

FIELD

The present disclosure relates to a method and apparatus for training memristive learning systems with stochastic learning algorithms.

BACKGROUND

Recently, significant advances were made in the machine learning algorithms that impact several application domains. It is imperative to map these learning algorithms to physical hardware, in order to achieve orders of magnitude improvement in performance, energy efficiency and form factor. Mapping to the hardware requires redesigning and optimizations to the algorithms at different abstractions.

Memristive learning systems (MLS) are designed using hybrid CMOS/memristor technologies, sometimes referred to in the literature as neuromemristive systems or neuromorphic systems. An MLS is an adaptable electronic system composed of at least one memristor. Memristors' behavioral similarity to biological synapses enables them to be incorporated into MLS as hardware synapse circuits. These systems are attractive for the design of power and area-constrained hardware neural network architectures. These architectures offer real-time parallel computation and high learning capacity for applications such as pattern classification, image and video processing, autonomous surveillance, and medical diagnostics, among others.

One of the most difficult challenges to overcome when designing an MLS is identifying a training algorithm which effectively minimizes a cost function and also has a low hardware overhead. Software implementations of artificial neural networks have many sophisticated algorithms available, such as backpropagation, resilient backpropagation, Levenberg-Marqaurdt, genetic algorithms, etc. At the core of many of these algorithms is the computation of error gradients and other complex operations in the space of the system's parameters. Current implementations of such operations in an MLS are deterministic and expensive due to the design complexity, area overhead, and power requirements of associated analog and digital circuitry.

The art lacks a method and apparatus for training MLSs which leverages stochastic approximations to deterministic training algorithms in order to reduce the design complexity, area, and power overhead of these systems.

SUMMARY

In accordance with an aspect of the present disclosure, there is provided a method for training a memristive learning system including identifying a task that the memristive learning system is to be trained to perform; identifying a cost function; choosing a deterministic update equation; deriving a stochastic update equation from the deterministic update equation; designing a training system hardware to implement the derived stochastic update equation; coupling the memristive learning system to the training system; and training the memristive learning system.

In accordance with an aspect of the present disclosure, there is provided a training system apparatus designed to implement stochastic learning algorithms.

DETAILED DESCRIPTION

Figure 1:
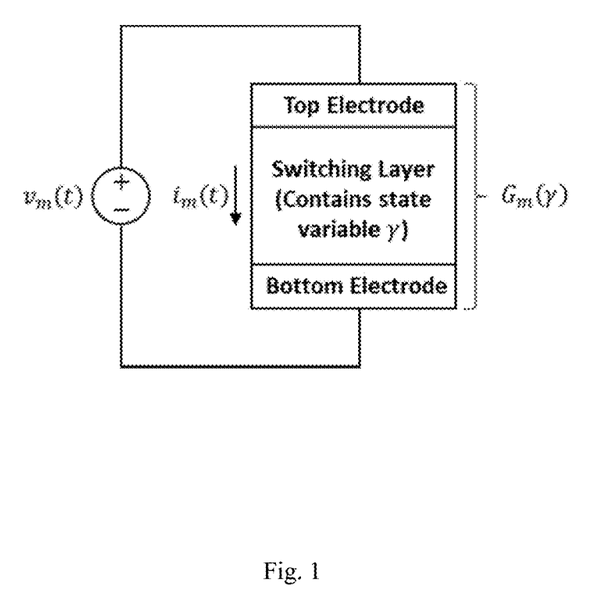
FIG. 1 shows a cross-section diagram of a memristor.

The present disclosure encompasses a method and apparatus for training memristive learning systems (MLSs), sometimes referred to in the literature as neuromemristive systems or neuromorphic systems. An MLS is an adaptive electronic system composed of at least one memristor, which is an electronic circuit device with a top electrode layer, a bottom electrode layer, and a switching layer that follows a state-dependent Ohm's law (see FIG. 1):

$$i_m(t) = G_m(\gamma) v_m(t), \quad (1)$$

where $i_m(t)$ is the current flowing through the memristor, $G_m(\gamma)$ is the memristor's conductance, $\gamma$ is a state variable, $v_m(t)$ is the voltage applied across the memristor, and t is time. Upon application of a voltage, a memristor will "switch" according to $$\frac{d\gamma}{dt} = \chi(\gamma, v_m(t), t) \quad (2)$$

where $\chi$ is a switching function governing the switching dynamics. The precise form of $\chi$ and the physical meaning of $\gamma$ are dependent on the specific materials used for the three memristor layers. A number of different materials and material combinations have been explored for this purpose Kuzum, D, Yu, S. and Wong, H-S. P. (2013). "Synaptic Electronics: Materials, Devices and Applications." Nanotechnology 24 (38), which is hereby incorporated by reference in its entirety. The top and bottom electrodes are typically implemented with metals, such as copper, aluminum, silver, and gold. Implementation of the switching layer has been demonstrated with transition metal oxides such as titanium dioxide and tantalum oxide, and other metal oxides, as well as chalcogenide materials like germanium selenide. For a specific material choice, $\gamma$ may be related to tunneling barrier width, cross sectional area of metallic filaments, doping front location, etc. In addition, the switching function $\chi$ may be linear, exponential, probabilistic, etc., depending on the material choice. Critically, however, every $\chi$ must follow $\chi(\gamma, v_m=0, t)=0$, meaning that the device is non-volatile (i.e., it will retain its state if no voltage is applied). It is this non-volatility, in conjunction with memristors' small footprint/high density, low power consumption, and ability to closely couple memory and processing that makes memristors an attractive technology choice for hardware learning systems.

Figure 2:
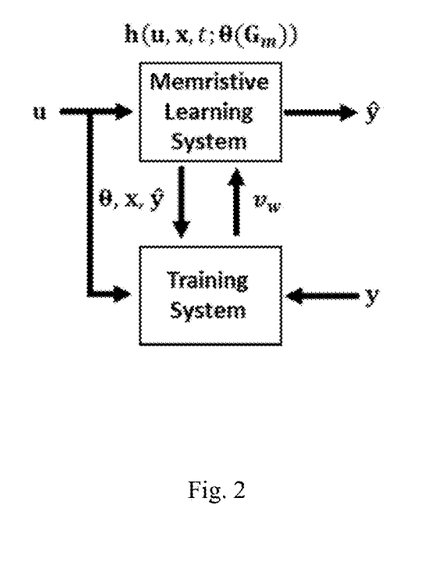
FIG. 2 shows a memristive learning system coupled with a training system.

Let $G_m$ be the set of all memristor conductance values in the MLS. Then, the MLS's overall functionality is defined by a hypothesis function h as $$\hat{y}=h(u, x, t; \theta(G_m)), \quad (3)$$

where $\hat{y}$ is a vector of system outputs, u is a vector of system inputs, x is a state vector that represents the current state of the system, t is time, and $\theta(G_m)$ is a parameter vector, each component of which depends on zero or more members of $G_m$ (see FIG. 2). Any quantitative value associated with the MLS can be considered part of its state, including inputs, outputs, time, parameter values, or expressions thereof. In addition, the specific form of the hypothesis function h depends on the MLS architecture, which may take the form of any adaptive/learning system, including support vector machines, decision trees, Bayesian networks, artificial neural networks (ANNs), and the like.

Figure 3:
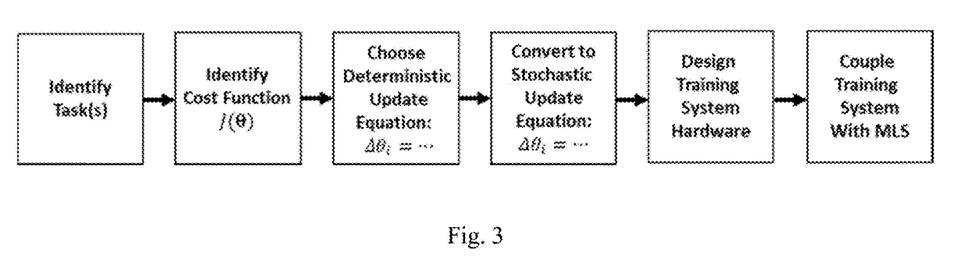
FIG. 3 is a flowchart in accordance with an embodiment of the present disclosure that shows the order of operations when designing a stochastic parameter update equation for an MLS.

An embodiment of a method for training an MLS is illustrated in FIG. 3. The method includes identifying a task or set of tasks that the MLS will be trained to perform. Possible tasks include but are not limited to image classification, time series prediction, function approximation, coincidence detection, clustering, and the like. It is important to note that a particular MLS architecture may be better suited for a given set of tasks than others. For example, a single-layer perceptron architecture, which is a type of ANN works well for classification of linearly-separable data. However, a support vector machine, or multi-layer perceptron architecture works much better for classification when data are not linearly separable. Therefore, an appropriate target task(s) will be constrained by the MLS architecture. The task(s) most suited for a given architecture can be determined from experimental and theoretical results in the literature by one of skill in the art.

The present method includes identifying a cost function $J(\theta)$, which quantifies the MLS's performance on the identified task(s). Various cost functions are defined in the literature for different tasks. For classification tasks, cross entropy cost functions are usually used, which quantify the error between the MLS's class prediction and the real class of an input (e.g., an image). Other tasks, such as regression, may use a mean square error cost function to quantify how well the MLS's hypothesis function fits a set of data. Other cost functions may take additional information into account, such as the complexity of the hypothesis function, by including regularization terms that limit the size of parameter values.

The present method includes identifying one or more deterministic update equations that set (either iteratively or in one step) $\theta(G_m)$ to a value that approximately minimizes, in either a global or local minimum sense, the chosen cost function. A particularly well-suited approach in the context of the current invention is gradient descent, where each parameter value is adjusted in the opposite direction of the cost gradient:

$$\Delta\theta_i = -\alpha \frac{\partial J}{\partial \theta_i}, \quad (4)$$

which can be written as $$\Delta\theta_i = -\alpha \frac{\partial J}{\partial x_1} \frac{\partial x_1}{\partial x_2} \cdots \frac{\partial x_q}{\partial \theta_i} \equiv \alpha x_1^* x_2^* \cdots x_q^*, \quad (5)$$

where $\alpha$ is called the learning rate and $x_i^*$ is shorthand for each of the partial derivatives. The value of $\alpha$ is chosen heuristically through trial and error. Generally, large $\alpha$ values may prevent the training process from converging, while very small values of $\alpha$ will cause training to be very time consuming. Note that other approaches to minimization of the cost function are also applicable, including but not limited to simulated annealing, genetic algorithms, Moore-Penrose inverse methods, and the like. Equation (5) is referred to as the deterministic update equation, and during the learning process, the update equation may be applied one or more times until the cost function reaches an acceptable value for the identified task(s). The deterministic equation may be supervised or unsupervised. A supervised equation includes a target final or intermediate result y that the MLS should try to achieve. For example, if the MLS task is image classification, then Equation (5) will often include the class label of the current input image. If the MLS task is regression, then Equation (5) will include the values of dependent variables associated with each observed data point. Examples of supervised equations include least-mean-squares and backpropagation, among others. An unsupervised equation does not include target values. Examples of unsupervised equations include spike time dependent plasticity, k-means clustering, and the like. One or more supervised equations can be combined with one or more unsupervised equations in a semi supervised learning process. Each of the partial derivatives in Equation (5) is usually represented as an analog voltage or current in an MLS. As a result, prior computing of the result required expensive (in terms of design complexity, area, and power consumption) arithmetic circuitry such as Gilbert and other transconductance multipliers, which have previously been used in the implementation of such algorithms.

The present method includes transforming the deterministic equation to a stochastic equation by changing each continuous analog value to a digital value $X_i$ drawn from a probability distribution D:

$$\Delta\theta_i = -\alpha X_1 X_2 \ldots X_q. \quad (6)$$

Since all of the values, except for $\alpha$ are now digital, Equation (7) can be computed using mostly digital logic gates, significantly reducing the design complexity and overhead of state-of-the-art methods. This allows the parameter update result to be computed using simpler logic circuits. Conversion of the variables in the deterministic equation to the stochastic equation depends on the probability distribution D. While it is possible to use any valid probability distribution (e.g. Normal, Beta, and the like), Bernoulli distributions work well because they are easy to implement in hardware, their probability mass functions are one-to-one, and their domain is 1 bit. For a Bernoulli distribution, each value of $X_i$ is chosen as $X_i \sim \text{Ber}(x_i^{*\prime})$, where $x_i^{*\prime}$ is a version of $x_i^*$ scaled between 0 and 1. As will be demonstrated in the example, this conversion can be accomplished in hardware using simple comparator circuits that compare $x_i^{*\prime}$ and $r_i$, which is an independent, uniform random number between 0 and 1. The hardware for random number generation may be designed following alternative methods, some of which are listed below.

The present method includes designing a training system to implement, either exactly or approximately, the stochastic equation. The specific hardware design depends on the exact form of the stochastic equation. A number of circuits exist for generating the random numbers $r_i$ required to convert the deterministic variables in the deterministic update equation to the stochastic variables in the stochastic update equation. In one embodiment of the disclosure, linear feedback shift registers may be used to generate a sequence of pseudorandom binary numbers that can be converted to analog voltages or currents, as needed. Cellular automata methods, thermal noise, metastability, and the like may also be used to generate random numbers. The required arithmetic and other operations in the stochastic update equation may be implemented with simple logic gates, since all of the stochastic variables are digital, and, in the case where a Bernoulli distribution is used, each stochastic variable is just one bit. The general approach is to ensure that every partial computation in the deterministic update equation, when using the scaled variables $x_i^{*'}$, is well-approximated by the expected output of a circuit with the associated stochastic inputs. For example, it can be shown that the expected output of an AND gate with inputs $X_1$ and $X_2$ is $x_1^{*'}x_2^{*'}$. Therefore, an AND gate is used for multiplication operations. It can also be shown that XOR gates approximate absolute differences, multiplexers perform scaled addition and, in general, the stochastic function of any circuit can be determined by deriving its expected output when its inputs are stochastic. Other hardware components may also be used for computing, e.g., the sign of a value, which can be determined using a comparator circuit. It is understood this example is one of several possible realizations of the stochastic training system hardware in accordance with the present disclosure.

The present method includes training the MLS by applying write voltages to one or more of the memristors that constitute the system's parameter vector $\theta(G_m)$. The interaction between the MLS and the training system hardware is illustrated in FIG. 2. The required state variables, including inputs, outputs, targets, etc. are read by the training system and used to calculate $\Delta\theta_i$ for all i using the hardware implementation of Equation (6). Then, $\Delta\theta_i$ is converted to a write voltage using Equation (2), and the write voltage is applied to the memristors whose conductances define $\theta_i$. In general, $G_m$ may be a non-linear function of $\gamma$ and $$\frac{d\gamma}{dt}$$

a non-linear function in the applied flux $\phi \equiv \int v_w dt$. However, the training process is made simpler by assuming that these functions are approximately linear, allowing the memristor's conductance to be tuned by application of a constant write voltage for short period of time. To increase the conductance, a positive voltage is applied. To decrease the conductance, a negative voltage is applied. The write voltage must be above or below the positive or negative threshold voltage for increasing or decreasing the conductance, respectively. The threshold voltages are functions of material properties. The magnitude of the write voltages and the time that the write voltages are applied defines the learning rate $\alpha$. Typical values for write voltages are on the order of 1 V, while typical values for write times vary widely for different devices, from sub-nanosecond to milliseconds. Values of $\alpha$ typically range between 0.001 and 1, and are determined through trial and error by one of ordinary skill in the art.

MLSs trained using the proposed method are applicable to a wide range of problem domains including but not limited to pattern classification (e.g., in images, videos and sounds), anomaly detection (e.g., identification of suspicious activities, anomalies in internet traffic, and the like.), data compression (e.g., using autoencoders), clustering problems in domains including big data, cloud computing, data mining, health care, bioinformatics, visual processing, natural language processing, and datacenters, and the like.

The present disclosure is an improvement over existing deterministic training algorithms used in hardware/embedded platforms. Stochastic update equations afford the ability to replace complex (in terms of design, area, and power consumption costs) training circuits with relatively simple digital logic circuits, leading to reduced training costs.

Merkel, C., & Kudithipudi, D. (2014). A current-mode CMOS/memristor hybrid implementation of an extreme learning machine. In *ACM Great Lakes Symposium on VLSI Design* (pp. 241-242); Merkel, C., & Kudithipudi, D. (2014). Neuromemristive Extreme Learning Machines for Pattern Classification. In *International Symposium on VLSI* (pp. 77-82); and Merkel, C., & Kudithipudi, D. (2014). A Stochastic Learning Algorithm for Neuromemristive Systems. In *System on Chip Conference* (pp. 359-364) are hereby incorporated by reference in their entirety.

The disclosure will be further illustrated with reference to the following specific examples disclosed therein. It is understood that these examples are given by way of illustration and are not meant to limit the disclosure or the claims to follow.

EXAMPLE 1

Figure 4:
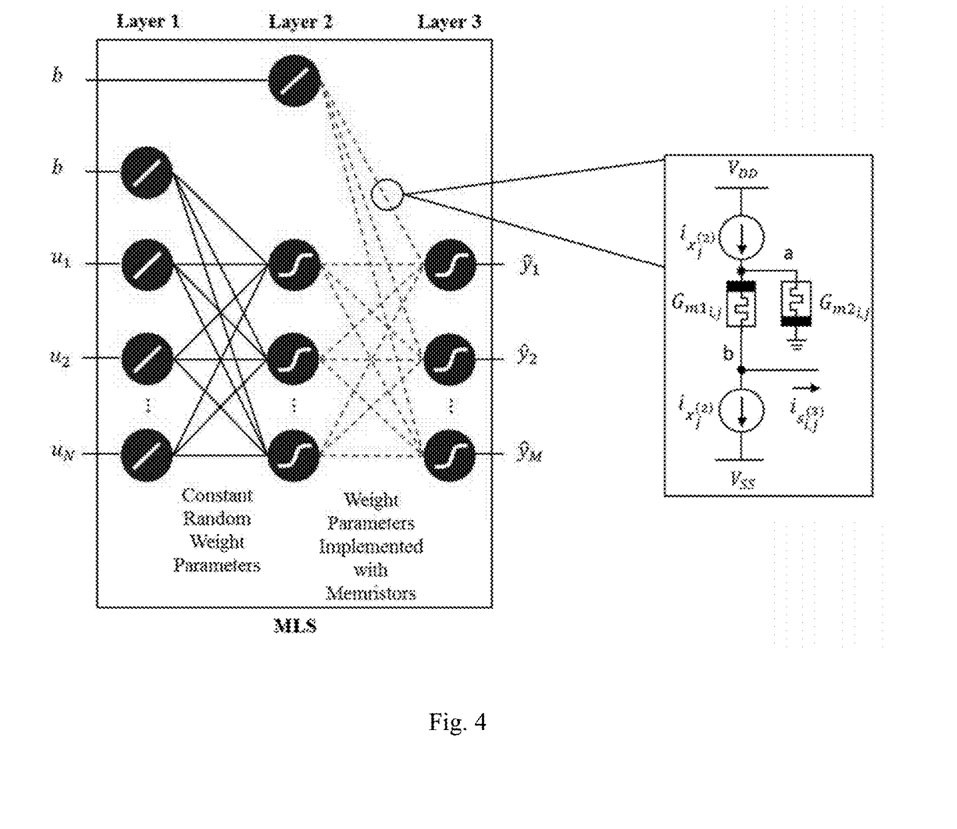
FIG. 4 is an example in accordance with an embodiment of the present disclosure of an MLS architecture.

As a concrete example, consider the task of classifying handwritten images from the MNIST dataset, LeCun, Y. (2016) http://yann.lecun.com/exdb/mnist/, which is hereby incorporated by reference in its entirety. A feasible MLS for this task is shown in FIG. 4. The architecture is a type of ANN called an extreme learning machine (ELM). ELMs have a three layer structure, similar to a typical multilayer perceptron. The ELM has N inputs and M outputs, the values of which are task-dependent. For the chosen task, N=25, corresponding to images of 5×5 pixels, and M=10, corresponding to digit class of 0,1, . . . ,9. Additional constant bias inputs b, with values equal to 1 are also present. The ELM hardware is implemented using a combination of standard complementary metal oxide semiconductor (CMOS) circuitry and memristors. Neurons, represented by circles, in each layer compute the sum of their weighted inputs. Each neuron's output is then a function of that sum, referred to as an activation function. The activation function for the neurons in the first layer is an identity function, represented by a diagonal line in the center of the neuron. In the second layer, all but one of the neurons has a logistic sigmoid activation function, represented by the curved line in the center of the neuron. The number of neurons in the second layer, referred to as $N_x$ is usually much larger than N, and is task-dependent. All of the neurons in the third layer also use a logistic sigmoid activation function. The connections between neurons are unidirectional (from left to right) and weighted, meaning that a value called a weight is multiplied by the output of one neuron before propagating to the next neuron. In this particular example, the weighted connections, or weights, between the first and second layers of neurons are implemented using CMOS circuits and are fixed, random values, uniformly distributed between −1 and 1. The weights between the second and third layers are implemented using memristor circuits, shown in FIG. 4. In this circuit, the input from the $j^{th}$ neuron in layer 2 is represented as a current $x_j^{(2)}$. The output current of the weight between the $j^{th}$ neuron in layer 2 and the $i^{th}$ neuron in layer three is $s_{i,j}^{(3)}$. The weight value is expressed as $$\theta_{i,j}^{(3)} = 2\left(\frac{G_{m1_{i,j}}}{G_{m1_{i,j}} + G_{m2_{i,j}}}\right) - 1, \qquad (7)$$

which will approximately range between −1 and 1 when the ratio of the maximum memristor conductance $G_{mon}$ to the minimum memristor conductance $G_{moff}$ is much greater than unity $$\left(\frac{G_{mon}}{G_{moff}} \gg 1\right).$$

Depending on the memristor materials used, this ratio can be on the order of $10^3$ or larger. The overall functionality of the ELM is described by its hypothesis function as $$\hat{y} = h(u, x, t; \theta(G_m)) = f_{sig}(\Theta^{(3)}[f_{sig}(\Theta^{(2)}[u|b]^T)|b]^T), \qquad (8)$$

where $f_{sig}$ is the logistic sigmoid activation function and | denotes augmentation. Here, $\Theta^{(2)}$ and $\Theta^{(3)}$ are $N_x \times N+1$ and $M \times N_x+1$ matrices containing $\theta$ values corresponding to the second and third layer weights, respectively. As described below, the ELM is trained to perform a particular task via modification of its parameter vector $\theta(G_m)$. This corresponds to modification of the memristor conductances associated with each weight between the second and third neuron layers. This is accomplished by applying a write voltage $v_w$ to terminal '1' of the weight circuit, while grounding terminal '2'. This process is discussed in more detail below.

The cost function for the handwritten digit classification task is the mean square error (MSE), defined as $$J(\theta(G_m)) = MSE \equiv \frac{1}{2m}\sum_{p=1}^{m}\sum_{i}^{M}\left(y_i^{(p)} - \hat{y}_i^{(p)}\right)^2, \qquad (9)$$

where m is the number of training inputs. The number p is an index specifying the current training input. In the case of handwritten digit classification, each training input is an image of a handwritten digit that is used as an example to tune the MLS's parameters.

One of the deterministic update equations for the cost function in Equation (9) is the online least-mean-squares (LMS) algorithm:

$$\Delta\theta_{i,j}^{(p,3)} = \alpha x_j^{(p)}(y_i^{(p)} - \hat{y}_i^{(p)}), \qquad (10)$$

where the index i refers to the output neurons (layer 3 in FIG. 4) and index j specifies the hidden layer neurons (layer 2 in FIG. 4). Equation (10) is referred to as 'online' because parameter updates take place after each input is applied to the MLS.

Now, Equation (10) is transformed into a stochastic update equation using the method discussed above, where the distribution D is a Bernoulli distribution:

$$\Delta\theta_{ij}^{(p,3)} = \alpha \text{sgn}(y_i^{(p)} - \hat{y}_i^{(p)}) X_j^{(p)} |Y_i^{(p)} - \hat{Y}_i^{(p)}|, \qquad (11)$$

where $\text{sgn}(\cdot)$ is −1 when the argument is negative, 0 when the argument is 0, and +1 otherwise.

Figure 5:
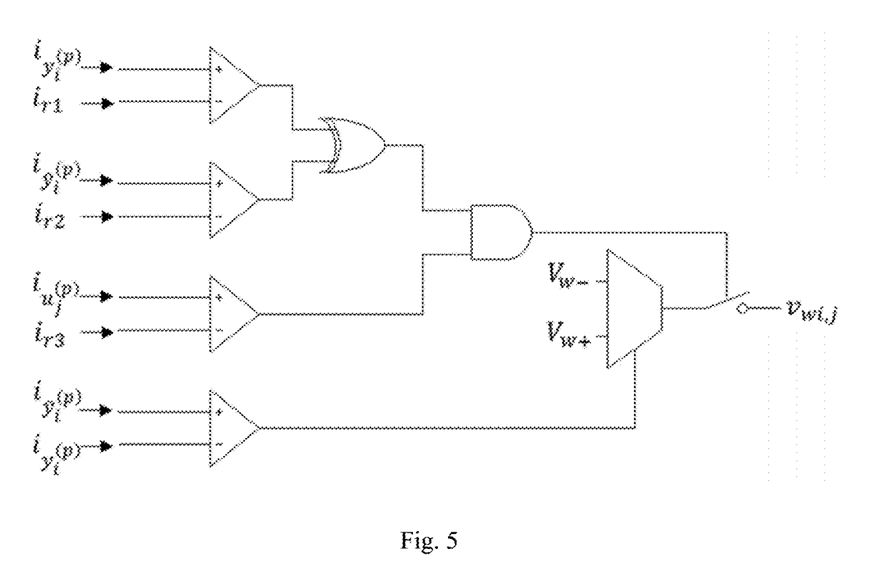
FIG. 5 is an embodiment of a training system in accordance with the present disclosure.
Figure 6:
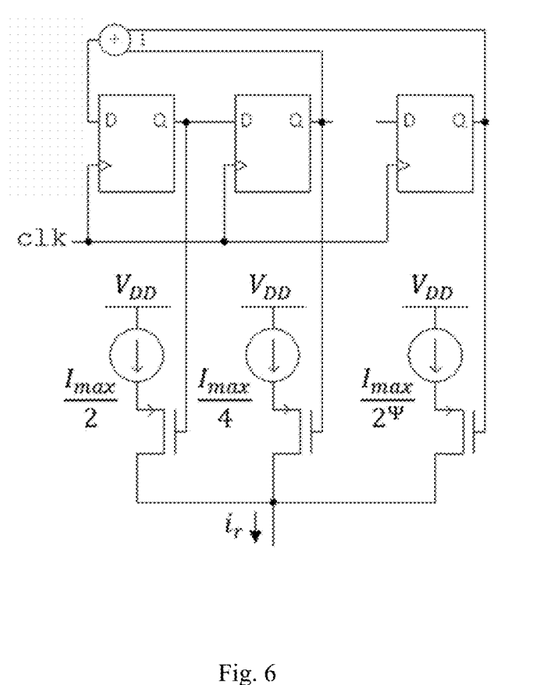
FIG. 6 is an example circuit design for generating uniform random numbers within the training system.

One proposed hardware implementation of (11) is shown in FIG. 5. Here, the probability distribution D is a Bernoulli distribution. In this case, information in the MLS is represented by current values, which are converted to Bernoulli-distributed stochastic variables using comparators and uniform random current values $i_r$, generated by a linear feedback shift register, as shown in FIG. 6. The final circuit output is a write voltage $v_w$, which is applied to terminal 1 of the weight circuit, while terminal 2 is grounded, as discussed previously. Note that $v_w$ is either $V_{w+}$, when the weight value is being increased and $V_{w-}$ when the weight value is being decreased. Multiplications in Equation (11) are performed using an AND gate, while the absolute difference value is approximated using an XOR gate. In addition, an enable signal en is used to control the amount of time that the write voltage is applied, thereby controlling the learning rate α. When 1000 training inputs are used and 1000 testing inputs are used, the ELM paired with the present training method achieves identical classification accuracy (percentage of correctly-classified test patterns) as the deterministic training method and has 3.5× reduction in area when compared to the deterministic training system.

Figure 7:
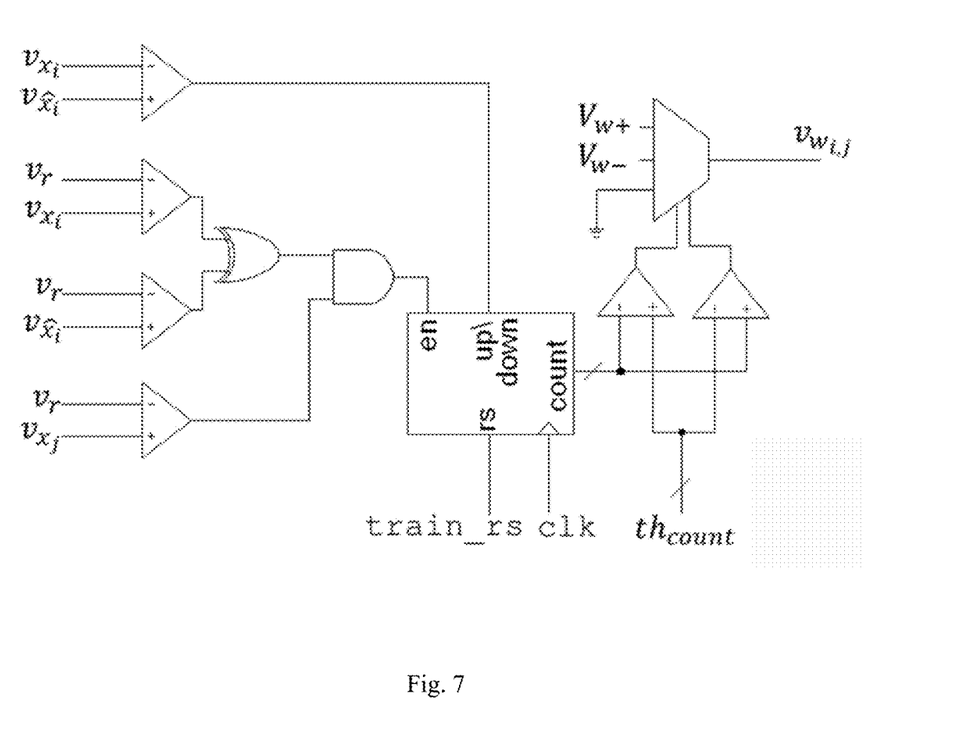
FIG. 7 is an alternative embodiment of a training system in accordance with the present disclosure.

As an alternative example, consider FIG. 7, which illustrates a stochastic training system for the same handwritten digit classification task using a different deterministic update equation (and resulting in a different stochastic update equation). The deterministic equation is a batch version of Equation (10), meaning that parameters are only updated after every training input has been observed. The addition of a counter in FIG. 7 enables the training system to keep track of the results from each training input. After each input has been applied, if the count is above a particular threshold $th_{count}$ then the memristors will be updated. Another difference that can be observed is that the inputs to the batch implementation are voltages, rather than currents, demonstrating the universality of the present method. The stochastic batch training system is able to achieve identical results as the deterministic batch training system with significant reduction in hardware.

Although various embodiments have been depicted and described in detail herein, it will be apparent to those skilled in the relevant art that various modifications, additions, substitutions, and the like can be made without departing from the spirit of the disclosure and these are therefore considered to be within the scope of the disclosure as defined in the claims which follow.

What is claimed:

1. A method for training a memristive learning system comprising:
   identifying a task that the memristive learning system is to be trained to perform;
   identifying a cost function;
   choosing a deterministic update equation;
   deriving a stochastic update equation from the deterministic update equation by converting the deterministic update equation into a stochastic bit stream;
   designing a training system hardware comprising reduced hardware training circuitry, cost and power consumption required to perform the task to implement the derived stochastic update equation by applying stochastic write voltages to the memristors where the stochastic write voltages are generated from the stochastic bit stream;
   coupling the memristive learning system to the training system; and
   training the memristive learning system to provide a trained memristive learning system while minimizing the hardware training circuitry, cost and power consumption required to train the memristive learning system.

2. The method of claim 1, wherein the task comprises image classification, time series prediction, function approximation, coincidence detection, or clustering.

3. The method of claim 1, wherein the deterministic equation is supervised, unsupervised, or semi supervised.

4. The method of claim 1, wherein the cost function comprises cross entropy or mean square error cost function.

5. The method of claim 1, wherein deriving a stochastic update equation from the deterministic update equation comprises changing each continuous analog value to a digital value drawn from a probability distribution.

6. The method of claim 1, wherein training the memristive learning system comprises applying voltages to at least one memristor of the memristive learning system and the adjusting the conductances of the at least one memristor based on the training system implementation of the stochastic equation in at least one of a supervised, unsupervised, and semi supervised fashion in order to change the learning system's functionality.

* * * * *